(12) United States Patent
Fujikawa et al.

(10) Patent No.: US 10,544,918 B2
(45) Date of Patent: Jan. 28, 2020

(54) FRESNEL LENS AND OPTICAL DEVICE PROVIDED WITH SAME

(71) Applicant: DAICEL CORPORATION, Osaka-shi, Osaka (JP)

(72) Inventors: Takeshi Fujikawa, Himeji (JP); Sadayuki Fukui, Himeji (JP)

(73) Assignee: DAICEL CORPORATION, Osaka-Shi (JP)

( * ) Notice: Subject to any disclaimer, the term of this patent is extended or adjusted under 35 U.S.C. 154(b) by 248 days.

(21) Appl. No.: 15/515,523

(22) PCT Filed: Oct. 7, 2015

(86) PCT No.: PCT/JP2015/078503
§ 371 (c)(1),
(2) Date: Mar. 29, 2017

(87) PCT Pub. No.: WO2016/063732
PCT Pub. Date: Apr. 28, 2016

(65) Prior Publication Data
US 2017/0227190 A1 Aug. 10, 2017

(30) Foreign Application Priority Data

Oct. 23, 2014 (JP) ................................. 2014-216112
Mar. 18, 2015 (JP) ................................. 2015-054461

(51) Int. Cl.
*G02B 1/04* (2006.01)
*F21V 5/04* (2006.01)
(Continued)

(52) U.S. Cl.
CPC ........ *F21V 5/045* (2013.01); *B29D 11/00269* (2013.01); *C08G 59/22* (2013.01);
(Continued)

(58) Field of Classification Search
CPC .. F21V 5/045; G02B 3/08; G02B 1/10; G02B 1/041; G02B 3/00; G02B 5/04; G02B 27/0972; G02B 5/045
See application file for complete search history.

(56) References Cited

U.S. PATENT DOCUMENTS 5,798,739 A * 8/1998 Teitel ................. G02B 27/0172
345/32
6,799,859 B1 * 10/2004 Ida ....................... G02B 6/0036
362/335
(Continued)

FOREIGN PATENT DOCUMENTS

JP 5-297465 A 11/1993
JP 2000-250105 A 9/2000
(Continued)

OTHER PUBLICATIONS

Fader et al., "Functional epoxy polymer for direct nano-imprinting of micro-optical elements," Microelectronic Engineering (2013), vol. 110, pp. 90-93.
(Continued)

*Primary Examiner* — Matthew J Daneils
*Assistant Examiner* — Wayne K. Swier
(74) *Attorney, Agent, or Firm* — Birch, Stewart, Kolasch & Birch, LLP (57) ABSTRACT

Provided is a Fresnel lens which has excellent heat resistance and which can covert light even from a poor-quality semiconductor light sources into uniform, high-quality light and can disperse the resulting light without lowering the central illuminance. The Fresnel lens according to the present invention includes two or more sawtooth prisms in a surface thereof and is made of a cured product of a curable composition containing an epoxy compound (A). Of the sawtooth prisms, a sawtooth prism having a longest inclined side in a cross section has a roughened surface, where the
(Continued)

(1-a)                    (1-b)

cross section is given by cutting the Fresnel lens in a plane which passes through the center of the Fresnel lens and which is perpendicular to a reference plane of the Fresnel lens.

4 Claims, 3 Drawing Sheets

(51) Int. Cl.
| | |
|---|---|
| G02B 3/08 | (2006.01) |
| B29D 11/00 | (2006.01) |
| C08G 59/22 | (2006.01) |
| C08G 59/24 | (2006.01) |
| F21V 5/00 | (2018.01) |
| H04N 5/225 | (2006.01) |
| B29K 63/00 | (2006.01) |
| B29K 509/00 | (2006.01) |

(52) U.S. Cl.
CPC ........... *C08G 59/226* (2013.01); *C08G 59/24* (2013.01); *C08G 59/245* (2013.01); *F21V 5/006* (2013.01); *G02B 1/041* (2013.01); *G02B 3/08* (2013.01); *H04N 5/2256* (2013.01); *B29K 2063/00* (2013.01); *B29K 2509/00* (2013.01)

(56) References Cited

U.S. PATENT DOCUMENTS

| | | | |
|---|---|---|---|
| 7,530,712 B2* | 5/2009 | Lin | ............ F21V 7/0008 362/247 |
| 2003/0161047 A1* | 8/2003 | Lee | ............ G02B 26/123 359/624 |
| 2004/0105155 A1 | 6/2004 | Hori et al. | |
| 2005/0162744 A1 | 7/2005 | Tenmyo | |
| 2009/0311630 A1 | 12/2009 | Noro et al. | |
| 2010/0149648 A1* | 6/2010 | Cho | ............ B29D 11/0074 359/625 |
| 2012/0319999 A1* | 12/2012 | Kamiya | ............ G02B 5/0231 345/175 |
| 2015/0003081 A1 | 1/2015 | Kobayashi et al. | |
| 2015/0086856 A1 | 3/2015 | Tomita et al. | |
| 2015/0212300 A1* | 7/2015 | Kubo | ............ G02B 1/041 359/754 |

FOREIGN PATENT DOCUMENTS

| | | |
|---|---|---|
| JP | 2004-62061 A | 2/2004 |
| JP | 2005-209549 A | 8/2005 |
| JP | 2006-297945 A | 11/2006 |
| JP | 2009-298112 A | 12/2009 |
| JP | 2012-82387 A | 4/2012 |
| JP | 2013-168346 A | 8/2013 |
| JP | 2013-212593 A | 10/2013 |
| JP | 2013-224349 A | 10/2013 |
| JP | 2014-130212 A | 7/2014 |
| WO | WO 2014/034507 A1 | 3/2014 |

OTHER PUBLICATIONS

International Search Report for PCT/JP2015/078503 (PCT/ISA/210) dated Jan. 12, 2016.
Written Opinion of the International Searching Authority for PCT/JP2015/078503 (PCT/ISA/237) dated Jan. 12, 2016.

* cited by examiner

FRESNEL LENS AND OPTICAL DEVICE PROVIDED WITH SAME

TECHNICAL FIELD

The present invention relates to a Fresnel lens which effectively disperses light from a light source while converting the light into uniform, high-quality light. The present invention also relates to an optical device including the Fresnel lens. This application claims priority to: Japanese Patent Application No. 2014-216112, filed Oct. 23, 2014 to Japan; and Japanese Patent Application No. 2015-054461, filed Mar. 18, 2015 to Japan, the entire contents of each of which applications are incorporated herein by reference.

BACKGROUND ART

Cameras mounted on portable electronic devices such as smartphones each include a flash lens disposed immediately in front of a light source so as to disperse light from the light source. The flash lens is mainly selected from Fresnel lenses, which are ready for reduction in thickness and size.

In an exemplary known method for producing a flash lens, a thermoplastic resin is subjected to injection molding, where the thermoplastic resin is exemplified typically by polycarbonates, poly(methyl methacrylate)s, and cycloolefin polymers (Patent Literature (PTL) 1 and PTL 2). Disadvantageously, however, such thermoplastic resins have low fluidity, cause deficiencies such as unfilled portions and weld lines, and cause poor appearances and/or lower mechanical strengths. In addition, the thermoplastic resins are disadvantageous in working efficiency. This is because molded articles obtained from the thermoplastic resins have poor heat resistance and cannot undergo (endure) board assembly via reflow soldering collectively with other parts or components. Independently, the use of silicones, which have heat resistance, is also known. Disadvantageously, however, this technique suffers from high material cost and poor shape transferability.

CITATION LIST

Patent Literature

PTL 1: Japanese Unexamined Patent Application Publication (JP-A) No. 2013-212593
PTL 2: JP-A No. 2013-224349

SUMMARY OF INVENTION

Technical Problem

The light source is often selected from small-sized semiconductor light sources such as LED light sources. Some of these semiconductor light sources emit yellowish light or emit nonuniform light. This requires flash lenses that can convert light even from such a poor-quality semiconductor light source into uniform, high-quality light and disperse the light.

Accordingly, the present invention has an object to provide a Fresnel lens which has excellent heat resistance and which can convert light even from a poor-quality semiconductor light source into uniform, high-quality light and disperse the light without lowering the central illuminance.

The present invention has another object to provide a method for producing the Fresnel lens.

The present invention has yet another object to provide an optical device including the Fresnel lens.

Solution to Problem

After intensive investigations to achieve the objects, the inventors of the present invention found that a cured product of a curable composition containing an epoxy compound (A) has excellent heat resistance; that a Fresnel lens including or made of the cured product, when including a specific prism having a roughened surface and when used as a flash lens, can convert light even from a poor-quality semiconductor light source into uniform, high-quality light and disperse the light without lowering the central illuminance. The present invention has been made on the basis of these findings.

Specifically, the present invention provides, in an aspect, a Fresnel lens including two or more sawtooth prisms in a surface thereof. The Fresnel lens is made of a cured product of a curable composition containing (A) an epoxy compound. Of the sawtooth prisms, a sawtooth prism having a longest inclined side in a cross section has a roughened surface, where the cross section is given by cutting the Fresnel lens in a plane which passes through the center of the Fresnel lens and which is perpendicular to a reference plane of the Fresnel lens.

In the Fresnel lens, the roughed surface may be present approximately only in the sawtooth prism having the longest inclined side in the cross section.

In the Fresnel lens, the epoxy compound (A) may contain a compound represented by Formula (a):

[Chem. 1]

where $R^1$ to $R^{18}$ are each, identically or differently, selected from hydrogen, halogen, an optionally oxygen- or halogen-containing hydrocarbon group, and optionally substituted alkoxy; and X is selected from a single bond and a linkage group.

In the Fresnel lens, the curable composition may further contain (B) an oxetane compound, and (C) a cationic-polymerization initiator, in addition to the epoxy compound (A).

The Fresnel lens may be a Fresnel lens for use in a flash (flash device).

The Fresnel lens may have a glass transition temperature of 100° C. or higher.

The present invention provides, in another aspect, a method for producing a Fresnel lens. The method includes subjecting a curable composition containing an epoxy compound (A) to cast molding to yield the Fresnel lens.

The method for producing a Fresnel lens may include steps 1 to 3 as follows. In the step 1, the curable composition containing the epoxy compound (A) is charged into an array mold. In the step 2, at least one of light and heat is applied to the curable composition to give an array of Fresnel lenses. In the step 3, the array of Fresnel lenses are separated into individual Fresnel lenses.

In the method for producing a Fresnel lens, the light may be applied using a UV-LED (with a wavelength of 350 to 450 nm).

The present invention provides, in yet another aspect, an optical device including the Fresnel lens.

In addition and advantageously, the present invention provides a method for producing an optical device. The method includes preparing a Fresnel lens by the method for producing a Fresnel lens. The prepared Fresnel lens is subjected to board assembly via a high-temperature heat treatment to yield the optical device.

In the method for producing an optical device, the high-temperature heat treatment may include reflow soldering.

Specifically, the present invention relates to the followings:

(1) A Fresnel lens comprising two or more sawtooth prisms in a surface thereof,
wherein the Fresnel lens is made of a cured product of a curable composition containing (A) an epoxy compound,
wherein, of the sawtooth prisms, a sawtooth prism having a longest inclined side in a cross section has a roughened surface, where the cross section is given by cutting the Fresnel lens in a plane which passes through a center of the Fresnel lens and which is perpendicular to a reference plane of the Fresnel lens.

(2) The Fresnel lens according to (1),
wherein the roughened surface is present approximately only in the sawtooth prism having the longest inclined side in the cross-section.

(3) The Fresnel lens according to one of (1) and (2), wherein the epoxy compound (A) comprises a compound represented by Formula (a).

(4) The Fresnel lens according to any one of (1) to (3), wherein the compound represented by Formula (a) is at least one compound selected from the group consisting of 3,4-epoxycyclohexylmethyl (3,4-epoxy)cyclohexanecarboxylate, (3,4,3',4'-diepoxy)bicyclohexyl, bis(3,4-epoxycyclohexylmethyl) ether, 1,2-epoxy-1,2-bis(3,4-epoxycyclohex-1-yl)ethane, 2,2-bis(3,4-epoxycyclohex-1-yl)propane, and 1,2-bis(3,4-epoxycyclohex-1-yl)ethane.

(5) The Fresnel lens according to any one of (1) to (4), wherein the curable composition further comprises (B) an oxetane compound and (C) a cationic-polymerization initiator, in addition to the epoxy compound (A).

(6) The Fresnel lens according to any one of (1) to (5), wherein the curable composition comprises the epoxy compound (A) in a content of 30 to 90 weight percent of the total weight of curable compounds in the curable composition.

(7) The Fresnel lens according to any one of (1) to (6), wherein the curable composition comprises the compound represented by Formula (a) in a content of 30 to 80 weight percent of the total weight of curable compounds in the curable composition.

(8) The Fresnel lens according to any one of (5) to (7), wherein the oxetane compound (B) is at least one compound selected from the group consisting of 3-methoxyoxetane, 3-ethoxyoxetane, 3-propoxyoxetane, 3-isopropoxyoxetane, 3-(n-butoxy)oxetane, 3-isobutoxyoxetane, 3-(s-butoxy)oxetane, 3-(t-butoxy)oxetane, 3-pentyloxyoxetane, 3-hexyloxyoxetane, 3-heptyloxyoxetane, 3-octyloxyoxetane, 3-(1-propenyloxy)oxetane, 3-cyclohexyloxyoxetane, 3-(4-methylcyclohexyloxy)oxetane, 3-((2-perfluorobutyl)ethoxy)oxetane, 3-phenoxyoxetane, 3-(4-methylphenoxy)oxetane, 3-(3-chloro-1-propoxy)oxetane, 3-(3-bromo-1-propoxy)oxetane, 3-(4-fluorophenoxy)oxetane, and compounds represented by Formulae (b-1) to (b-15).

(9) The Fresnel lens according to any one of (5) to (8), wherein the curable composition comprises the oxetane compound (B) in a content of 5 to 40 weight percent of the total weight of curable compounds in the curable composition.

(10) The Fresnel lens according to any one of (5) to (9), wherein the cationic-polymerization initiator (C) is a cationic photoinitiator including a cationic moiety and an anionic moiety, where the cationic moiety is an arylsulfonium ion, and the anionic moiety is selected from the group consisting of $((Y)_k B(Phf)_{4-k})^-$ (where Y is selected from phenyl and biphenylyl; Phf represents a group resulting from replacing at least one of hydrogen atoms of a phenyl group with at least one selected from perfluoroalkyl, perfluoroalkoxy, and halogen; and k represents an integer of 0 to 3), $BF_4^-$, $PF_6^-$, $((Rf)_t PF_{6-t})^-$ (where Rf represents a group resulting from replacing 80% or more of hydrogen atoms of an alkyl group with fluorine atoms; and t represents an integer of 1 to 5), $AsF_6^-$, $SbF_6^-$, and $SbF_5OH^-$.

(11) The Fresnel lens according to any one of (5) to (10), wherein the curable composition comprises 0.1 to 10.0 parts by weight of the cationic-polymerization initiator (C) per 100 parts by weight of the total weight curable compounds in the curable composition.

(12) The Fresnel lens according to any one of (1) to (11), wherein the curable composition comprises 0.1 to 10.0 parts by weight of (D) an antioxidant per 100 parts by weight of curable compounds in the curable composition.

(13) The Fresnel lens according to any one of (1) to (12), for use in a flash (flash device).

(14) The Fresnel lens according to any one of (1) to (13), wherein the Fresnel lens has a glass transition temperature of 100° C. or higher.

(15) A method for producing a Fresnel lens, the method comprising
subjecting a curable composition comprising an epoxy compound (A) to cast molding to yield the Fresnel lens according to any one of (1) to (14).

(16) The method according to (15) for producing a Fresnel lens, the method comprising the steps of:
1) charging the curable composition comprising the epoxy compound (A) into an array mold;
2) applying at least one of light and heat to the curable composition to yield an array of Fresnel lenses; and
3) separating the array of Fresnel lenses into individual Fresnel lenses.

(17) The method according to (16) for producing a Fresnel lens, wherein the light is applied using a UV-LED (with a wavelength of 350 to 450 nm).

(18) An optical device comprising the Fresnel lens according to any one of (1) to (14).

(19) The optical device according to (18), wherein the optical devise is selected from the group consisting of portable electronic devices and on-vehicle electronic devices.

(20) The optical device according to one of (18) and (19), wherein the optical device is obtained by subjecting the Fresnel lens to board assembly via a high-temperature heat treatment.

(21) The optical device according to one of (18) and (19), wherein the optical device is obtained by subjecting the Fresnel lens to board assembly via reflow soldering.

(22) A method for producing an optical device, the method comprising preparing a Fresnel lens by the method according to any one of (15) to (17); and subjecting the prepared Fresnel lens to board assembly via a high-temperature heat treatment to yield an optical device.

(23) The method according to (22) for producing an optical device, wherein the high-temperature heat treatment comprises reflow soldering.

Advantageous Effects of Invention

The Fresnel lens according to the present invention includes (is made of) a cured product of a curable composition containing an epoxy compound (A) and includes a prism having a roughened surface at a specific site.

The Fresnel lens therefore has excellent heat resistance, can be subjected to board assembly collectively with other parts or components via reflow soldering (in particular, lead-free soldering), and can give an optical device including the Fresnel lens with excellent working efficiency. In addition, the Fresnel lens is also usable in on-vehicle electronic devices, which require heat resistance.

The Fresnel lens according to the present invention, when used, can convert light even from a poor-quality semiconductor light source into uniform, high-quality light and disperse the light without lowering the central illuminance. Consequently, the Fresnel lens according to the present invention is advantageously usable typically as or in flash Fresnel lenses of cameras to be mounted on portable electronic devices such as smartphones; and prisms or Fresnel lenses for use in on-vehicle electronic devices.

BRIEF DESCRIPTION OF DRAWINGS

FIGS. 1-a and 1-b are a schematic cross-sectional view and a schematic top view, respectively, of a Fresnel lens according to an embodiment of the present invention;

FIGS. 2-a and 2-b are a cross-sectional view and a schematic perspective view, respectively, of a Fresnel lens according to another embodiment of the present invention;

FIGS. 3-c-1 and 3-c-2 are schematic cross-sectional views of Fresnel lenses each in a cross section given by cutting the Fresnel lens at a plane which passes through the center of the Fresnel lens and which is perpendicular to a reference plane of the Fresnel lens. FIGS. 3-c-1 and 3-c-2 each illustrate, in the cross section, inclined sides 1 defined by a lens surface; inclined sides 2 defined by a non-lens surface; and the reference plane 3. FIG. 3-c-1 illustrates an embodiment in which the inclined sides 1 defined by the lens surface are circular arcs; and FIG. 3-c-2 illustrates an embodiment in which the inclined sides 1 defined by the lens surface are straight lines;

DESCRIPTION OF EMBODIMENTS

Curable Composition
Epoxy Compound (A)

The curable composition for use in the present invention contains one or more curable compounds (in particular, cationically curable compounds) including an epoxy compound.

Non-limiting examples of the epoxy compound include aromatic glycidyl ether epoxy compounds such as bisphenol-A diglycidyl ether and bisphenol-F diglycidyl ether; cycloaliphatic glycidyl ether epoxy compounds such as hydrogenated bisphenol-A diglycidyl ether and hydrogenated bisphenol-F diglycidyl ether; aliphatic glycidyl ether epoxy compounds; glycidyl ester epoxy compounds; glycidylamine epoxy compounds; cycloaliphatic epoxy compounds; and epoxy-modified siloxane compounds. The curable composition may contain each of different epoxy compounds alone or in combination.

The curable composition for use in the present invention preferably contains, in particular, one or more cycloaliphatic epoxy compounds so as to give a cured product having excellent mechanical strengths. In the context of the present invention, the "cycloaliphatic epoxy compound" refers to a compound containing a cycloaliphatic epoxy group (such as cyclohexene oxide group) which contains an oxygen atom bonding in a triangular arrangement to two adjacent carbon atoms constituting an alicycle.

Non-limiting examples of the cycloaliphatic epoxy compounds include compounds represented by Formula (a):

[Chem. 2]

(a)

In Formula (a), $R^1$ to $R^{18}$ are each, identically or differently, selected from hydrogen, halogen, an optionally oxygen- or halogen-containing hydrocarbon group, and optionally substituted alkoxy. X is selected from a single bond and a linkage group.

Non-limiting examples of the halogen as $R^1$ to $R^{18}$ include fluorine, chlorine, bromine, and iodine.

The hydrocarbon group as $R^1$ to $R^{18}$ is preferably selected from $C_1$-$C_{20}$ hydrocarbon groups and is exemplified by, but not limited to, aliphatic hydrocarbon groups, cycloaliphatic hydrocarbon groups, aromatic hydrocarbon groups, and groups each including two or more of them bonded to each other.

The aliphatic hydrocarbon groups are preferably selected from $C_1$-$C_{20}$ aliphatic hydrocarbon groups and are exemplified by, but not limited to, $C_1$-$C_{20}$ alkyls such as methyl, ethyl, propyl, isopropyl, butyl, hexyl, octyl, isooctyl, decyl, and dodecyl, of which $C_1$-$C_{10}$ alkyls are preferred, and $C_1$-$C_4$ alkyls are particularly preferred; $C_2$-$C_{20}$ alkenyls such as vinyl, allyl, methallyl, 1-propenyl, isopropenyl, 1-butenyl, 2-butenyl, 3-butenyl, 1-pentenyl, 2-pentenyl, 3-pentenyl, 4-pentenyl, and 5-hexenyl, of which $C_2$-$C_{10}$ alkenyls are preferred, and $C_2$-$C_4$ alkenyls are particularly preferred; and $C_2$-$C_{20}$ alkynyls such as ethynyl and propynyl, of which $C_2$-$C_{10}$ alkynyls are preferred, and $C_2$-$C_4$ alkynyls are particularly preferred.

The alicyclic hydrocarbon groups are preferably selected from $C_3$-$C_{15}$ alicyclic hydrocarbon groups and are exemplified by, but not limited to, $C_3$-$C_{12}$ cycloalkyls such as cyclopropyl, cyclobutyl, cyclopentyl, cyclohexyl, and cyclododecyl; $C_3$-$C_{12}$ cycloalkenyls such as cyclohexenyl; and $C_4$-$C_{15}$ bridged hydrocarbon groups such as bicycloheptyl and bicycloheptenyl.

The aromatic hydrocarbon groups are preferably selected from $C_6$-$C_{14}$ aromatic hydrocarbon groups and are exemplified by, but not limited to, $C_6$-$C_{14}$ aryls such as phenyl and naphthyl, of which $C_6$-$C_{10}$ aryls are preferred.

Of the groups including two or more groups selected from the aliphatic hydrocarbon groups, alicyclic hydrocarbon groups, and aromatic hydrocarbon groups bonded to each other, non-limiting examples of groups each including an aliphatic hydrocarbon group and an alicyclic hydrocarbon group bonded to each other include ($C_3$-$C_{12}$ cycloalkyl)-substituted $C_1$-$C_{20}$ alkyls such as cyclohexylmethyl; and ($C_1$-$C_{20}$ alkyl)-substituted $C_3$-$C_{12}$ cycloalkyls such as methylcyclohexyl. Non-limiting examples of groups each including an aliphatic hydrocarbon group and an aromatic hydrocarbon group bonded to each other include $C_7$-$C_{18}$ aralkyls such as benzyl and phenethyl, of which $C_7$-$C_{10}$ aralkyls are typified; ($C_6$-$C_{14}$ aryl)-substituted $C_2$-$C_{20}$ alkenyls such as cinnamyl; ($C_1$-$C_{20}$ alkyl)-substituted $C_6$-$C_{14}$ aryls such as tolyl; and ($C_2$-$C_{20}$ alkenyl)-substituted $C_6$-$C_{14}$ aryls such as styryl.

Non-limiting examples of the optionally oxygen- or halogen-containing hydrocarbon group as $R^1$ to $R^{18}$ include groups resulting from replacing at least one hydrogen atom in each of the above-mentioned hydrocarbon groups with an oxygen-containing group or a halogen-containing group. Non-limiting examples of the oxygen-containing group include hydroxy; hydroperoxy; $C_1$-$C_{10}$ alkoxys such as methoxy, ethoxy, propoxy, isopropyloxy, butoxy, and isobutyloxy; $C_2$-$C_{10}$ alkenyloxys such as allyloxy; tolyloxy, naphthyloxy, and other $C_6$-$C_{14}$ aryloxys optionally substituted with one or more substituents selected from $C_1$-$C_{10}$ alkyls, $C_2$-$C_{10}$ alkenyls, halogens, and $C_1$-$C_{10}$ alkoxys; $C_7$-$C_{18}$ aralkyloxys such as benzyloxy and phenethyloxy; $C_1$-$C_{10}$ acyloxys such as acetyloxy, propionyloxy, (meth)acryloyloxy, and benzoyloxy; $C_1$-$C_{10}$ alkoxy-carbonyls such as methoxycarbonyl, ethoxycarbonyl, propoxycarbonyl, and butoxycarbonyl; phenoxycarbonyl, tolyloxycarbonyl, naphthyloxycarbonyl, and other $C_6$-$C_{14}$ aryloxy-carbonyls optionally substituted with one or more substituents selected from $C_1$-$C_{10}$ alkyls, $C_2$-$C_{10}$ alkenyls, halogens, and $C_1$-$C_{10}$ alkoxys; $C_7$-$C_{18}$ aralkyloxy-carbonyls such as benzyloxy-carbonyl; epoxy-containing groups such as glycidyloxy; oxetanyl-containing groups such as ethyloxetanyloxy; $C_1$-$C_{10}$ acyls such as acetyl, propionyl, and benzoyl; isocyanato; sulfo; carbamoyl; oxo; and groups each including two or more of these groups bonded to each other through a single bond or $C_1$-$C_{10}$ alkylene. Non-limiting examples of the halogen-containing group include fluorine, chlorine, bromine, and iodine atoms.

Non-limiting examples of the alkoxy as $R^1$ to $R^{18}$ include $C_1$-$C_{10}$ alkoxys such as methoxy, ethoxy, propoxy, isopropyloxy, butoxy, and isobutyloxy.

Non-limiting examples of the substituents which the alkoxy may have include halogens, hydroxy, $C_1$-$C_{10}$ alkoxys, $C_2$-$C_{10}$ alkenyloxys, $C_6$-$C_{14}$ aryloxys, $C_1$-$C_{10}$ acyloxys, mercapto, $C_1$-$C_{10}$ alkylthios, $C_2$-$C_{10}$ alkenylthios, $C_6$-$C_{14}$ arylthios, $C_7$-$C_{18}$ aralkylthios, carboxy, alkoxy-carbonyls, $C_6$-$C_{14}$ aryloxy-carbonyls, $C_7$-$C_{18}$ aralkyloxy-carbonyls, amino, mono-or di-($C_1$-$C_{10}$ alkyl) aminos, acylaminos, epoxy-containing groups, oxetanyl-containing groups, $C_1$-$C_{10}$ acyls, oxo, and groups each including two or more of these groups bonded to each other through a single bond or $C_1$-$C_{10}$ alkylene.

In particular, $R^1$ to $R^{18}$ are preferably hydrogen atoms.

X in Formula (a) is selected from a single bond and a linkage group (a divalent group containing one or more atoms). Non-limiting examples of the linkage group include divalent hydrocarbon groups, groups resulting from epoxidizing part or all of carbon-carbon double bond(s) of alkenylene groups, carbonyl, ether bond, ester bond, amido, and groups each including two or more of these groups linked to each other.

Non-limiting examples of the divalent hydrocarbon groups include linear or branched $C_1$-$C_{18}$ alkylene groups such as methylene, methylmethylene, dimethylmethylene, ethylene, propylene, and trimethylene groups, of which linear or branched $C_1$-$C_3$ alkylene groups are preferred; and $C_3$-$C_{12}$ cycloalkylene groups and $C_3$-$C_{12}$ cycloalkylidene groups, such as 1,2-cyclopentylene, 1,3-cyclopentylene, cyclopentylidene, 1,2-cyclohexylene, 1,3-cyclohexylene, 1,4-cyclohexylene, and cyclohexylidene groups, of which $C_3$-$C_6$ cycloalkylene groups and $C_3$-$C_6$ cycloalkylidene groups are preferred.

The groups resulting from epoxidizing part or all of carbon-carbon double bond(s) of alkenylene groups are hereinafter also referred to as "epoxidized alkenylene groups". Non-limiting examples of the alkenylene groups in the epoxidized alkenylene groups include $C_2$-$C_8$ linear or branched alkenylene groups such as vinylene, propenylene, 1-butenylene, 2-butenylene, butadienylene, pentenylene, hexenylene, heptenylene, and octenylene groups. In particular, the epoxidized alkenylene groups are preferably selected from groups resulting from epoxidizing all of carbon-carbon double bond(s) of alkenylene groups, and are more preferably selected from groups resulting from epoxidizing all of carbon-carbon double bond(s) of $C_2$-$C_4$ alkenylene groups.

Representative, but non-limiting examples of the compounds represented by Formula (a) include 3,4-epoxycyclohexylmethyl (3,4-epoxy)cyclohexanecarboxylate, (3,4,3',4'-diepoxy)bicyclohexyl, bis(3,4-epoxycyclohexylmethyl) ether, 1,2-epoxy-1,2-bis(3,4-epoxycyclohex-1-yl)ethane, 2,2-bis(3,4-epoxycyclohex-1-yl)propane, and 1,2-bis(3,4-epoxycyclohex-1-yl)ethane. The epoxy compound (A) may contain each of them alone or in combination.

The epoxy compound (A) may contain one or more other epoxy compounds than the cycloaliphatic epoxy compounds. The epoxy compound (A) preferably contains one or more glycidyl ether epoxy compounds, and particularly preferably contains at least one compound selected from aromatic glycidyl ether epoxy compounds and alicyclic glycidyl ether epoxy compounds. This is preferred for adjusting the refractive index.

The curable composition may contain the epoxy compound (A) in a content of typically 30 to 90 weight percent, preferably 50 to 90 weight percent, and particularly preferably 60 to 85 weight percent, of the total weight (100 weight percent) of curable compounds in the curable composition. When the curable composition contains two or more different epoxy compounds (A), the term "content" refers to the total content of them. The curable composition, if containing the component (A) in a content less than the range, tends to cause the cured product to have lower strengths. In contrast, the curable composition, if containing the component (A) in a content greater than the range, tends to offer lower curability.

The curable composition may contain the cycloaliphatic epoxy compound in a content of typically 30 to 80 weight percent, preferably 30 to 70 weight percent, and particularly preferably 40 to 60 weight percent, of the total weight (100 weight percent) of curable compounds in the curable composition. When the curable composition contains two or more different cycloaliphatic epoxy compounds, the term "content" refers to the total content of them. The curable composition, if containing the cycloaliphatic epoxy com- pound in a content less than the range, tends to offer lower curability. In contrast, the curable composition, if containing the cycloaliphatic epoxy compound in a content greater than the range, tends to cause the cured product to be brittle.

Oxetane Compound (B)

The curable composition for use in the present invention may further contain one or more other curable compounds (in particular, cationically curable compounds) than the epoxy compounds (A) and preferably further contains one or more oxetane compounds for still better curability.

Such oxetane compounds are represented typically by Formula (b):

[Chem. 3]

where $R^a$ represents a monovalent organic group; $R^b$ is selected from hydrogen and ethyl; and m represents an integer of 0 or more.

Examples of the monovalent organic group as $R^a$ include monovalent hydrocarbon groups, monovalent heterocyclic groups, substituted oxycarbonyls (such as $C_1$-$C_4$ alkoxycarbonyls, $C_6$-$C_{14}$ aryloxy-carbonyls, $C_7$-$C_{18}$ aralkyloxycarbonyls, and $C_3$-$C_{12}$ cycloalkyloxy-carbonyls), substituted carbamoyls (such as N-($C_1$-$C_4$ alkyl)-carbamoyls and N-($C_6$-$C_{14}$ aryl)-carbamoyls), acyls (exemplified by $C_1$-$C_4$ aliphatic acyls such as acetyl; and $C_6$-$C_{14}$ aromatic acyls such as benzoyl), and monovalent groups each including two or more of these groups bonded to each other through a single bond or a linkage group.

Non-limiting examples of the monovalent hydrocarbon groups are as with $R^1$ to $R^{18}$ in Formula (a).

The monovalent hydrocarbon groups may each have one or more of various substituents. Non-limiting examples of such substituents include halogens, oxo, hydroxy, substituted oxys (such as alkoxys, aryloxys, aralkyloxys, and acyloxys), carboxy, substituted oxycarbonyls (such as alkoxycarbonyls, aryloxycarbonyls, and aralkyloxycarbonyls), substituted or unsubstituted carbamoyls, cyano, nitro, substituted or unsubstituted aminos, sulfo, and heterocyclic groups. The hydroxy and carboxy may each be protected with a protecting group commonly used in the field of organic synthesis.

Non-limiting examples of heterocyclic rings constituting the heterocyclic groups include 3- to 10-membered rings (preferably 4- to 6-membered rings) each containing carbon atoms and at least one heteroatom (such as oxygen, sulfur, or nitrogen atom) constituting the ring; and fused rings derived from these rings. Specifically, examples of the heterocyclic rings include, but are not limited to, oxygen-containing heterocyclic rings, sulfur-containing heterocyclic rings, and nitrogen-containing heterocyclic rings, where oxygen, sulfur, and oxygen are heteroatoms. Non-limiting examples of the oxygen-containing heterocyclic rings include 4-membered rings such as oxetane ring; 5-membered rings such as furan, tetrahydrofuran, oxazole, isoxazole, and γ-butyrolactone rings; 6-membered rings such as 4-oxo-4H-pyran, tetrahydropyran, and morpholine rings; fused rings such as benzofuran, isobenzofuran, 4-oxo-4H-chromene, chroman, and isochroman rings; and bridged rings such as 3-oxatricyclo[4.3.1.1$^{4,8}$]undecan-2-one and 3-oxatricyclo[4.2.1.0$^{4,8}$]nonan-2-one rings. Non-limiting examples of the sulfur-containing heterocyclic rings include 5-membered rings such as thiophene, thiazole, isothiazole, and thiadiazole rings; 6-membered rings such as 4-oxo-4H-thiopyran ring; and fused rings such as benzothiophene ring. Non-limiting examples of the nitrogen-containing heterocyclic rings include 5-membered rings such as pyrrole, pyrrolidine, pyrazole, imidazole, and triazole rings; 6-membered rings such as pyridine, pyridazine, pyrimidine, pyrazine, piperidine, and piperazine rings; and fused rings such as indole, indoline, quinoline, acridine, naphthyridine, quinazoline, and purine rings. Non-limiting examples of the monovalent heterocyclic groups include groups resulting from removing one hydrogen atom from each of the structural formulae of the heterocyclic rings.

The heterocyclic groups may each have one or more substituents. Non-limiting examples of the substituents include the substituents which the hydrocarbon groups may have; as well as alkyls (exemplified by $C_1$-$C_4$ alkyls such as methyl and ethyl), cycloalkyls (such as $C_3$-$C_{12}$ cycloalkyls), and aryls (exemplified by $C_6$-$C_{14}$ aryls such as phenyl and naphthyl.

Non-limiting examples of the linkage group include carbonyl (—CO—), ether bond (—O—), thioether bond (—S—), ester bond (—COO—), amido bond (—CONH—), carbonate bond (—OCOO—), silyl bond (—Si—), and groups each including two or more of them linked to each other.

Non-limiting examples of the compounds represented by Formula (b) include 3-methoxyoxetane, 3-ethoxyoxetane, 3-propoxyoxetane, 3-isopropoxyoxetane, 3-(n-butoxy)oxetane, 3-isobutoxyoxetane, 3-(s-butoxy)oxetane, 3-(t-butoxy)oxetane, 3-pentyloxyoxetane, 3-hexyloxyoxetane, 3-heptyloxyoxetane, 3-octyloxyoxetane, 3-(1-propenyloxy)oxetane, 3-cyclohexyloxyoxetane, 3-(4-methylcyclohexyloxy)oxetane, 3-[(2-perfluorobutyl)ethoxy]oxetane, 3-phenoxyoxetane, 3-(4-methylphenoxy)oxetane, 3-(3-chloro-1-propoxy)oxetane, 3-(3-bromo-1-propoxy)oxetane, 3-(4-fluorophenoxy)oxetane, and compounds represented by Formulae (b-1) to (b-15):

[Chem. 4]

The oxetane compounds for use herein may also be available as commercial products such as ARON OXETANE OXT-101, ARON OXETANE OXT-121, ARON OXETANE OXT-212, ARON OXETANE OXT-211, ARON OXETANE OXT-213, ARON OXETANE OXT-221, and ARON OXETANE OXT-610 (each from Toagosei Co., Ltd.).

The curable composition may contain the oxetane compound in a content of typically 5 to 40 weight percent, preferably 5 to 30 weight percent, and particularly preferably 10 to 30 weight percent, of the total weight (100 weight percent) of curable compounds in the curable composition. When the curable composition contains two or more different oxetane compounds, the term "content" refers to the total content of them. The curable composition preferably contains the oxetane compound in a content within the range, because the curable composition, when containing the oxetane compound in a content within the range, effectively offers better curability while allowing the cured product to surely have strengths.

Other Curable Compounds

The curable composition for use in the present invention may contain one or more other curable compounds than the epoxy compounds (A) and the oxetane compounds (B), but may contain the other curable compounds in a content of typically 30 weight percent or less, preferably 20 weight percent or less, particularly preferably 10 weight percent or less, and most preferably 5 weight percent or less, of the total weight (100 weight percent) of curable compounds in the curable composition. The curable composition, when containing two or more different other curable compounds, the term "content" refers to the total content of them. The curable composition, if containing the other curable compounds in a content greater than the range, tends to less offer the advantageous effects of the present invention.

Cationic-Polymerization Initiator (C)

The curable composition preferably contains one or more cationic-polymerization initiators. Such cationic-polymerization initiators may be selected typically from cationic photoinitiators and cationic thermal initiators.

The cationic photoinitiators are compounds that generate acids by irradiation with light, to initiate curing reactions of cationically curable compounds in the curable composition. The cationic photoinitiators each include a cationic moiety that absorbs light; and an anionic moiety that acts as an acid source. The curable composition may contain each of different cationic photoinitiators alone or in combination.

Examples of the cationic photoinitiators include, but are not limited to, diazonium salt compounds, iodonium salt compounds, sulfonium salt compounds, phosphonium salt compounds, selenium salt compounds, oxonium salt compounds, ammonium salt compounds, and bromine salt compounds.

Among them, sulfonium salt compounds are preferably employed in the present invention. This is preferred for forming a cured product with excellent curability. Non-limiting examples of the cationic moieties of the sulfonium salt compounds include arylsulfonium ions such as (4-hydroxyphenyl)methylbenzylsulfonium ion, triphenylsulfonium ion, diphenyl[4-(phenylthio)phenyl]sulfonium ion, 4-(4-biphenylylthio)phenyl-4-biphenylylphenylsulfonium ion, and tri-p-tolylsulfonium ion, of which triarylsulfonium ions are typified.

Non-limiting examples of the anionic moieties of the cationic photoinitiators include $[(Y)_kB(Phf)_{4-k}]^-$ (where Y is selected from phenyl and biphenylyl; Phf represents a group resulting from replacing at least one hydrogen atom of a phenyl group with at least one selected from perfluoroalkyls, perfluoroalkoxys, and halogens; and k represents an integer of 0 to 3), $BF_4^-$, $PF_6^-$, $[(Rf)_tPF_{6-t}]^-$ (where Rf represents a group resulting from replacing 80% or more of hydrogen atoms of an alkyl group with fluorine atoms; and t represents an integer of 1 to 5), $AsF_6^-$, $SbF_6^-$, and $SbF_5OH^-$. In particular, cationic photoinitiators each including $SbF_6^-$ as an anionic moiety are preferred, because they have high activities as initiators and can give a cured product having excellent heat resistance with high curability.

Non-limiting examples of the cationic photoinitiators include 4-(phenylthio)phenyldiphenylsulfonium hexafluoroantimonate, (4-hydroxyphenyl)methylbenzylsulfonium tetrakis(pentafluorophenyl)borate, 4-(4-biphenylylthio)phenyl-4-biphenylylphenylsulfonium tetrakis(pentafluorophenyl)borate, 4-(phenylthio)phenyldiphenylsulfonium phenyltris(pentafluorophenyl)borate, [4-(4-biphenylylthio)phenyl]-4-biphenylylphenylsulfonium phenyltris(pentafluorophenyl)borate, diphenyl[4-(phenylthio)phenyl]sulfonium tris(pentafluoroethyl)trifluorophosphate, diphenyl[4-(phenylthio)phenyl]sulfonium tetrakis(pentafluorophenyl)borate, diphenyl[4-(phenylthio)phenyl]sulfonium hexafluorophosphate, 4-(4-biphenylylthio)phenyl-4-biphenylylphenylsulfonium tris(pentafluoroethyl)trifluorophosphate, bis[4-(diphenylsulfonio)phenyl]sulfide phenyltris(pentafluorophenyl)borate, [4-(2-thioxanthonylthio)phenyl]phenyl-2-thioxanthonylsulfonium phenyltris(pentafluorophenyl)borate, as well as commercial products available typically under the trade names of: CYRACURE UVI-6970, CYRACURE UVI-6974, CYRACURE UVI-6990, and CYRACURE UVI-950 (each from Union Carbide Corporation, U.S.A.), Irgacure 250, Irgacure 261, and Irgacure 264 (each from BASF SE), CG-24-61 (from Ciba Geigy Ltd.), OPTOMER SP-150, OPTOMER SP-151, OPTOMER SP-170, and OPTOMER SP-171 (each from ADEKA CORPORATION), DAICAT II (from Daicel Corporation), UVAC 1590, and UVAC 1591 (each from DAICEL-CYTEC Company, Ltd.), CI-2064, CI-2639, CI-2624, CI-2481, CI-2734, CI-2855, CI-2823, CI-2758, and CIT-1682 (each from Nippon Soda Co., Ltd.), PI-2074 (from Rhodia; toluylcumyliodonium tetrakis(pentafluorophenyl)borate), FFC 509 (from 3M Company), BBI-102, BBI-101, BBI-103, MPI-103, TPS-103, MDS-103, DTS-103, NAT-103, and NDS-103 (each from Midori Kagaku Co., Ltd.), CD-1010, CD-1011, and CD-1012 (each from Sartomer Company, Inc., U.S.A.), and CPI-100P and CPI-101A (each from San-Apro Ltd.).

The cationic thermal initiators are compounds that generate acids upon heat treatment to initiate curing reactions of cationically curable compounds in the curable composition. The cationic thermal initiators each include a cationic moiety that absorbs heat, and an anionic moiety that acts as an acid source. The curable composition may contain each of different cationic thermal initiators alone or in combination.

Examples of the cationic thermal initiators include, but are not limited to, iodonium salt compounds and sulfonium salt compounds.

Non-limiting examples of the cationic moieties of the cationic thermal initiators include monoarylsulfonium ions such as 4-hydroxyphenyl-methyl-benzylsulfonium, 4-hydroxyphenyl-methyl-(2-methylbenzyl)sulfonium, 4-hydroxyphenyl-methyl-1-naphthylmethylsulfonium, and p-methoxycarbonyloxyphenyl-benzyl-methylsulfonium ions.

Non-limiting examples of the anionic moieties of the cationic thermal initiators are as with the anionic moieties of the cationic photoinitiators.

Non-limiting examples of the cationic thermal initiators include 4-hydroxyphenyl-methyl-benzylsulfonium phenyltris(pentafluorophenyl)borate, 4-hydroxyphenyl-methyl-(2-methylbenzyl)sulfonium phenyltris(pentafluorophenyl)borate, 4-hydroxyphenyl-methyl-1-naphthylmethylsulfonium phenyltris(pentafluorophenyl)borate, and p-methoxycarbonyloxyphenyl-benzyl-methylsulfonium phenyltris(pentafluorophenyl)borate.

In particular, the curable composition preferably contains one or more cationic photoinitiators for excellent storage stability.

The curable composition may contain the cationic-polymerization initiator or initiators in a content of typically 0.1 to 10.0 parts by weight, preferably 0.1 to 5.0 parts by weight, particularly preferably 0.2 to 3.0 parts by weight, and most preferably 0.2 to 1.0 part by weight, per 100 parts by weight of curable compound or compounds (in particular, cationically curable compound or compounds; when two or more different compounds of this category are contained, the total amount of them) in the curable composition. The curable composition, if containing the cationic-polymerization initiator or initiators in a content less than the range, tends to offer lower curability. In contrast, the curable composition, if containing the cationic-polymerization initiator or initiators in a content greater than the range, tends to cause the cured product to be susceptible to coloring.

Other Components

The curable composition for use in the present invention may contain one or more other components than the epoxy compound (A), the oxetane compound (B), and the polymerization initiator (C), within ranges not adversely affecting the advantageous effects of the present invention. Non-limiting examples of the other components include antioxidants, photosensitizers, antifoaming agents, leveling agents, coupling agents, surfactants, flame retardants, ultraviolet absorbers, and colorants. The curable composition may contain each of them alone or in combination.

Among them, the curable composition for use in the present invention preferably contains (D) an antioxidant. This is preferred for allowing the resulting cured product to have still better heat resistance.

Non-limiting examples of the antioxidant include phenolic antioxidants, phosphorus antioxidants, thio ester antioxidants, and amine antioxidants. The use of at least one of a phenolic antioxidant and a phosphorus antioxidant is preferred in the present invention, for allowing the resulting cured product to have still better heat resistance.

Non-limiting examples of the phenolic antioxidants include pentaerythritol tetrakis[3-(3,5-di-t-butyl-4-hydroxyphenyl)propionate], thiodiethylene bis[3-(3,5-di-t-butyl-4-hydroxyphenyl)propionate], octadecyl 3-(3,5-di-t-butyl-4-hydroxyphenyl)propionate, N,N'-hexamethylene-bis[3-(3,5-di-t-butyl-4-hydroxyphenyl)propionamide], octyl 3-(4-hydroxy-3,5-diisopropylphenyl)propionate, 1,3,5-tris(4-hydroxy-3,5-di-t-butylbenzyl)-2,4,6-trimethylbenzene, 2,4-bis(dodecylthiomethyl)-6-methylphenol, and calcium bis[3,5-di(t-butyl)-4-hydroxybenzyl(ethoxy)phosphinate]. The phenolic antioxidants for use in the present invention may be selected from commercial products available typically under the trade names of: Irganox 1010, Irganox 1035, Irganox 1076, Irganox 1098, Irganox 1135, Irganox 1330, Irganox 1726, and Irganox 1425WL (each from BASF SE).

Non-limiting examples of the phosphorus antioxidants include 3,9-bis(octadecyloxy)-2,4,8,10-tetraoxa-3,9-diphosphaspiro[5.5]undecane, 3,9-bis(2,6-di-t-butyl-4-methylphenoxy)-2,4,8,10-tetraoxa-3,9-diphosphaspiro[5.5]undecane, 2,2'-methylenebis(4,6-di-t-butylphenyl)-2-ethylhexyl phosphite, and tris(2,4-di-t-butylphenyl) phosphite. The phosphorus antioxidants for use in the present invention may be selected from commercial products available typically under the trade names of: PEP-8, PEP-8W, PEP-36/36A, HP-10, 2112, 2112RG, and 1178 (each from ADEKA CORPORATION).

The curable composition may contain the antioxidant (D) in a proportion of typically 0.1 to 10.0 parts by weight, preferably 0.5 to 5.0 parts by weight, and particularly preferably 0.5 to 3.0 parts by weight, per 100 parts by weight of the amount of a curable compound (in particular, a cationically curable compound) in the curable composition. When the curable composition contains two or more different antioxidants, the term "proportion" refers to the total proportion of them. When the curable composition contains two or more different curable compounds, the term "amount" refers to the total weight of them.

Examples of the colorants (or coloring agents) include pigments and dyes. The curable composition may contain each of them alone or in combination.

Examples of the pigments include, but are not limited to, inorganic pigments, organic pigments, and pigments each including an inorganic pigment and a coating of an organic material (such as a resin) disposed on the inorganic pigment. Non-limiting examples of the inorganic pigments include carbon black, chromium oxide, iron oxides, black titanium oxide, acetylene black, lampblack, bone black, graphite, iron black (black synthetic oxide), copper chrome black, copper iron manganese black, chromium cobalt iron black, ruthenium oxide, graphite, fine particles of metals (such as aluminum), fine particles of metal oxides, fine particles of complex oxides, fine particles of metal sulfides, and fine particles of metal nitrides. Non-limiting examples of the organic pigments include perylene black, cyanine black, aniline black, azo pigments, anthraquinone pigments, isoindolinone pigments, indanthrene pigments, indigo pigments, quinacridone pigments, dioxazine pigments, tetraazaporphyrin pigments, triarylmethane pigments, phthalocyanine pigments, perylene pigments, benzimidazolone pigments, and rhodamine pigments.

Non-limiting examples of the dyes include azo dyes, anthraquinone dyes, indigo dyes, carbonyl dyes, xanthene dyes, quinonimine dyes, quinoline dyes, tetraazaporphyrin dyes, triarylmethane dyes, naphthoquinone dyes, nitro dyes, phthalocyanine dyes, fluoran dyes, perylene dyes, methine dyes, and rhodamine dyes. Non-limiting examples of the anthraquinone dyes include Acid Violet 39, Acid Violet 41, Acid Violet 42, Acid Violet 43, Acid Violet 48, Acid Violet 51, Acid Violet 34, Acid Violet 47, Acid Violet 109, Acid Violet 126, Basic Violet 24, Basic Violet 25, Disperse Violet 1, Disperse Violet 4, Disperse Violet 26, Disperse Violet 27, Disperse Violet 28, Disperse Violet 57, Solvent Violet 11, Solvent Violet 13, Solvent Violet 14, Solvent Violet 26, Solvent Violet 28, Solvent Violet 31, Solvent Violet 36, Solvent Violet 37, Solvent Violet 38, Solvent Violet 48, Solvent Violet 59, Solvent Violet 60, Vat Violet 13, Vat Violet 15, and Vat Violet 16.

The curable composition may contain the colorant in a content of typically about 10 to about 300 ppm of the total amount of the curable composition, while the content may be adjusted as appropriate according to the intended use. The lower limit of the content is preferably 50 ppm, and particularly preferably 100 ppm. When the curable composition contains two or more different colorants, the term "content" refers to the total content of them.

The curable composition may be prepared typically by stirring and mixing the components in predetermined proportions and, as needed, debubbling the mixture in a vacuum.

The curable composition has excellent curability and can be rapidly cured upon the application of at least one of light and heat to form a cured product.

Fresnel Lens

A Fresnel lens is a lens having a smaller thickness by concentrically cutting a spherical or aspherical lens having a continuous lens surface (or continuous refracting surface) and structurally has sawtooth prisms disposed stepwise. The sawtooth prisms each include a "lens surface" that turns the direction of light traveling; and a "non-lens surface" that transmits light. The Fresnel lens according to the present invention is a Fresnel lens which has two or more sawtooth prisms and effectively concentrates or disperses light (see, for example, FIGS. 1-*a*, 1-*b*, 2-*a*, and 2-*b*).

Figure 1:
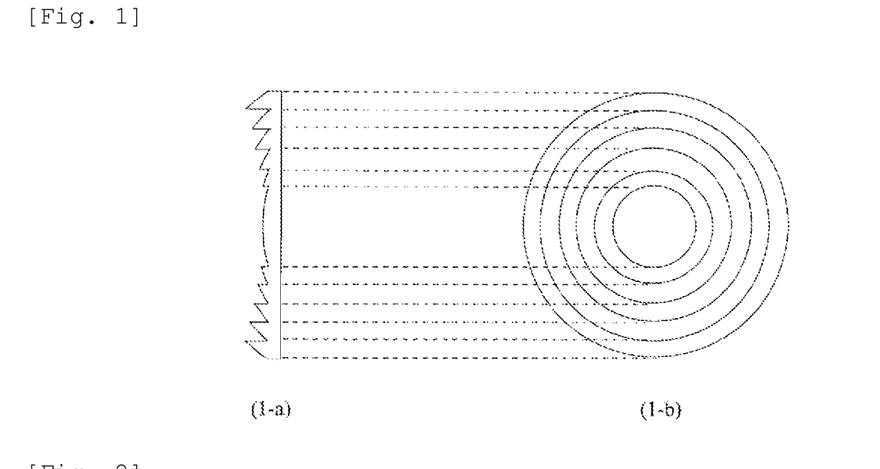
Figure 2:
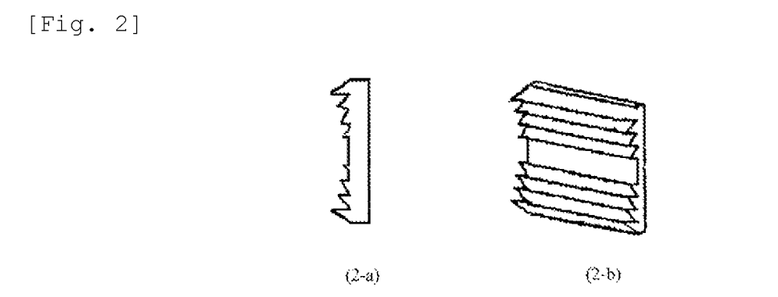
Figure 3:
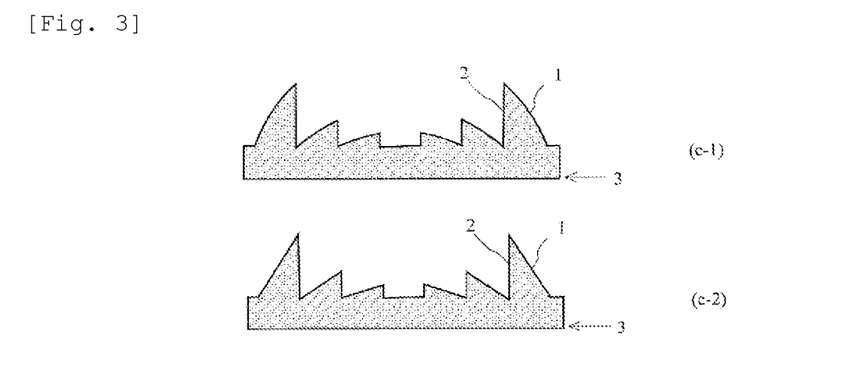

The Fresnel lens according to the present invention is as follows. Assume that the Fresnel lens is cut in a plane which passes through the center of the Fresnel lens and which is perpendicular to a reference plane of the Fresnel lens to define a cross section, where the reference plane is a flat surface of the Fresnel lens, which is backside with respect to the surface at which the sawtooth prisms are disposed. In this cross section, pairs of an inclined side defined by a lens surface and an inclined side defined by a non-lens surface define a step sawtooth shape, and the step sawtooth shape continuously decreases (or increases) in height toward the center, where the inclined side by the lens surface may be a straight line or a circular arc (see (FIGS. 3-*c*-1 and 3-*c*-2). An sawtooth prism that has (defines) the longest inclined side out of the inclined sides (in particular, inclined sides defined by lens surfaces) has a roughened surface (surface undergone a roughening treatment).

The roughening treatment is a treatment to form fine asperities. In the Fresnel lens according to the present invention, which is obtained via the roughening treatment, the sawtooth prism having the longest inclined side in a cross section has a surface having fine asperities, where the cross section is given by cutting the Fresnel lens in a plane which passes through the center of the Fresnel lens and which is perpendicular to the reference plane of the Fresnel lens. Of the sawtooth prism, the surface having fine asperities may occupy, of surfaces defining the sawtooth prism, at least the entire lens surface of the sawtooth prism that has the longest inclined side, and preferably occupy the entire lens surface and the entire non-lens surface of the sawtooth prism that has the longest inclined side, namely, the entire surfaces defining the sawtooth prism that has the longest inclined side.

The fine asperities are not limited, as long as having such a shape as to convert light emitted from a semiconductor light source into uniform, high-quality light and to disperse the resulting light. The fine asperities may have an arithmetic mean surface roughness (Ra) of typically about 0.3 to about 40 μm, preferably 1 to 30 μm, particularly preferably 1 to 20 μm, and most preferably 5 to 20 μm. The fine asperities may be aligned, or disposed at random.

The other sawtooth prisms may have surface fine asperities. However, it is preferred that the roughened surface (surface undergone a roughening treatment) is present in approximately only the sawtooth prism having the longest inclined side. This is referred for maintaining the central illuminance at high level. Accordingly, the other sawtooth prisms preferably have smooth surfaces and may have an arithmetic mea surface roughness (Ra) of typically preferably less than 0.3 μm, and more preferably 0.1 μm or less.

The Fresnel lens according to the present invention has such a shape that the specific region has undergone a roughening treatment (has a roughed surface). The Fresnel lens can therefore convert light even from a low-quality light source into uniform, high-quality light and disperse the resulting light without lowering the central illuminance.

The Fresnel lens according to the present invention has excellent heat resistance and has a glass transition temperature (Tg) of typically 100° C. or higher (e.g., 100° C. to 200° C.), and preferably 120° C. or higher (e.g., 120° C. to 180° C.). The Fresnel lens can therefore maintain the special shape even when subjected to a board assembly process via soldering (in particular, lead-free soldering) using a reflow oven. In addition, the Fresnel lens is also usable in on-vehicle electronic devices, which require heat resistance. The glass transition temperature of the Fresnel lens can be measured by a method described in the working examples.

Assume that the Fresnel lens according to the present invention is prepared via integral molding by a production method mentioned below. This Fresnel lens resists weld line formation and has excellent mechanical strengths and a satisfactorily beautiful appearance.

The Fresnel lens according to the present invention combines the properties and is advantageously used typically as or in camera flash Fresnel lenses in portable electronic devices such as smartphones; and prisms or Fresnel lenses for use in on-vehicle electronic devices.

Fresnel Lens Production Method

Figure 4:
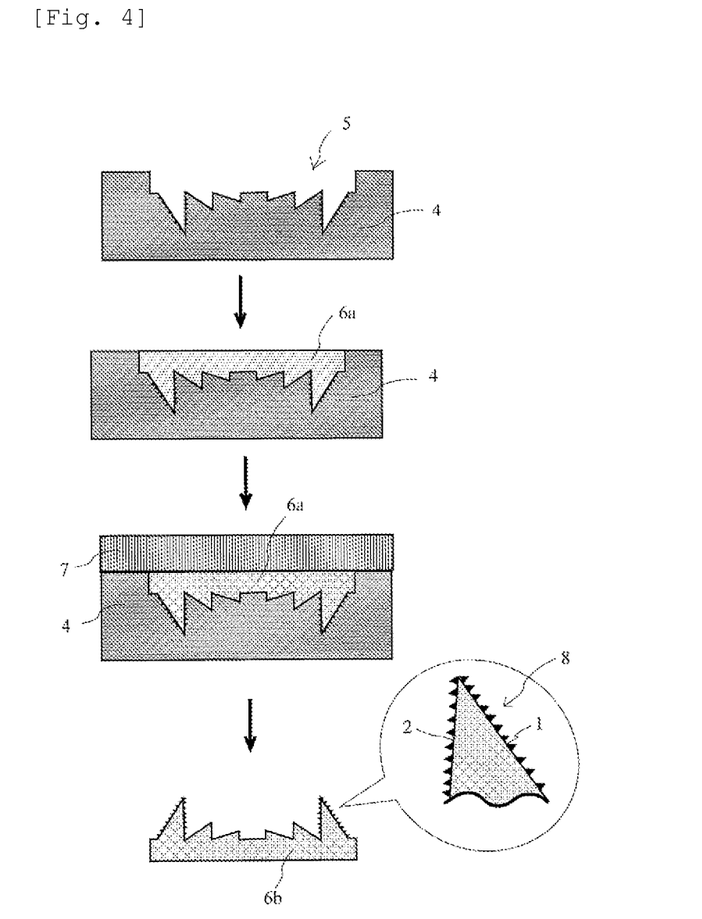
FIG. 4 schematically illustrates a method for producing a Fresnel lens 6b according to an embodiment of present invention.

The Fresnel lens according to the present invention may be produced typically by subjecting the curable composition to cast molding. For example, the Fresnel lens may be produced by charging the curable composition into a concavity of a drag (lower die) and applying at least one of light and heat to the curable composition which is covered with a cope (upper die) (see FIG. 4). The concavity is a concavity having a reversed shape corresponding to a Fresnel lens having sawtooth prisms, in which, of the sawtooth prisms, a sawtooth prism having the longest inclined side in a cross section has a roughed surface, where the cross section is given by cutting the Fresnel lens in a plane which passes through the center of the Fresnel lens and which is perpendicular to the reference plane of the Fresnel lens.

Alternatively, the Fresnel lens according to the present invention may also be produced in the following manner. Initially, the curable composition is charged into a concavity of a drag, where the concavity has a reversed shape of a Fresnel lens in which none of sawtooth prisms has a roughened surface. At least one of light and heat is applied to the curable composition in the concavity while being covered with a cope, to give a Fresnel lens. Of the sawtooth prisms of the Fresnel lens, a sawtooth prism having the longest inclined side in a cross section given by cutting the Fresnel lens is subjected to a roughening treatment to give the target Fresnel lens. Non-limiting examples of the roughening treatment include sand blasting and chemical machining (etch machining).

Non-limiting examples of the mold for use in the cast molding includes a mold having one concavity having a reversed shape of a Fresnel lens; and an array mold having two or more concavities each having a reversed shape of a Fresnel lens. The two or more concavities may be disposed at random or at regular intervals. In particular, the array mold is preferably used in the present invention for volume production of the Fresnel lens to offer better production efficiency.

The Fresnel lens according to the present invention is particularly preferably produced via steps 1 to 3 as follows. The step 1 is the step of charging a curable composition containing an epoxy compound (A) into an array mold. The step 2 is the step of applying at least one of light and heat to the curable composition to give an array of Fresnel lenses. The step 3 is the step of separating the array of Fresnel lenses into individual Fresnel lenses.

Examples of a technique to charge the curable composition into the array mold in the step 1 include a process using a dispenser, screen process printing, curtain coating, and spraying. The curable composition has excellent fluidity, thereby has satisfactory chargeability, and can produce a Fresnel lens to which the mold shape is transferred excellently, namely, the resulting Fresnel lens offers excellent reproducibility of the concavity shape of the mold. The array mold may include two or more parts such as a drag and a cope. The array mold may have undergone a surface release treatment such as coating with a release agent. When the curable composition is cured by the application of light, the array mold is preferably selected from transparent array molds.

The step 2 is the step of curing the curable composition. The curable composition for use herein, when containing a cationic photoinitiator as the cationic-polymerization initiator (C), can be cured by light irradiation. The light (actinic radiation) for use in the light irradiation can be any light such as infrared rays, visible light, ultraviolet rays, X rays, electron beams, alpha rays, beta rays, and gamma rays. Among them, ultraviolet rays are preferred in the present invention for their excellent handleability. The ultraviolet irradiation can be performed using any illuminant such as UV-LEDs (with a wavelength of 350 to 450 nm), high-pressure mercury lamps, ultra-high pressure mercury lamps, xenon lamps, carbon arc, metal halide lamps, sunlight, and laser. The curable composition has excellent curability and allows a curing reaction to proceed rapidly even when irradiated with light from a UV-LED.

The light irradiation conditions are as follows. Upon ultraviolet irradiation, the irradiation conditions are preferably adjusted at a cumulative irradiance of typically 5000 mJ/cm$^2$ or less (e.g., 2500 to 5000 mJ/cm$^2$).

After the light irradiation, demolding is performed to give an array of Fresnel lenses. As needed, post-baking may be performed before and/or after the demolding. The post-baking may be performed typically by heating at 80° C. to 180° C. for 5 to 30 minutes.

The curable composition, when containing a cationic thermal initiator as the cationic-polymerization initiator (C), can be cured by subjecting the curable composition to a heat treatment (e.g., heating at a temperature of 100° C. to 200° C. for about 0.5 to about 2 hours).

Figure 5:
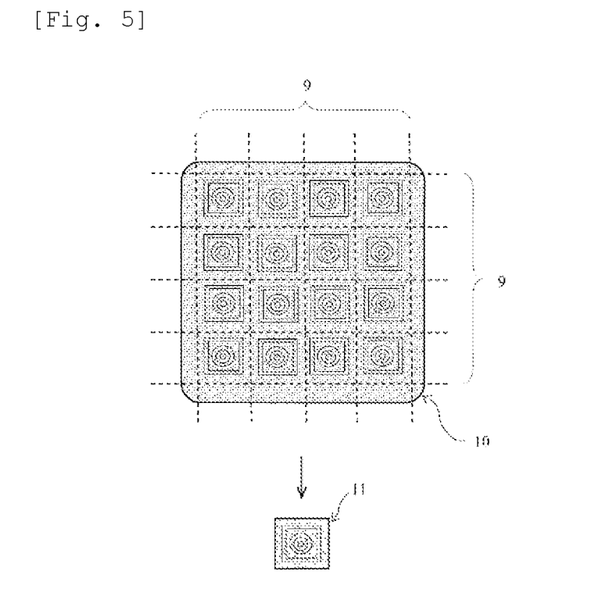
FIG. 5 schematically illustrates how to give a Fresnel lens 11 by cutting an array 10 of Fresnel lenses on cutting lines 9 to separate the array into individual Fresnel lenses, where the array has been prepared using an array mold.

The array of Fresnel lenses is a structure including two or more Fresnel lenses bonded to each other through a linkage portion or portions. The step 3 is the step of cutting the array of Fresnel lenses at the linkage portions into individual Fresnel lenses. Namely, the step 3 is a dicing step (see FIG. 5). The cutting may be performed using a cutting means such as a dicing blade.

The method according to the present invention for producing a Fresnel lens enables integral molding of a specially-shaped Fresnel lens. The resulting Fresnel lens has excellent mechanical strengths and a satisfactorily beautiful appearance. In addition, the method according to the present invention for producing a Fresnel lens enables efficient volume production of the Fresnel lens. The method according to the present invention for producing a Fresnel lens is therefore appropriate as a method for the production of typically camera flash Fresnel lenses in portable electronic devices such as smartphones; and prisms or Fresnel lenses for use in on-vehicle electronic devices.

Optical Device

An optical device according to the present invention includes the Fresnel lens. Non-limiting examples of the optical device according to the present invention include portable electronic devices such as cellular phones, smartphones, and tablet personal computers; and on-vehicle electronic devices such as near-infrared sensors, millimeter-wave radars, LED spotlighting devices, near-infrared LED lighting systems, mirror monitors, meter panels, head-mounted (projection) display combiners, and head-up display combiners. The Fresnel lens has such sufficient heat resistance as to undergo board assembly by a high-temperature heat treatment (such as reflow soldering and other treatments at high temperatures of 260° C. or higher). Thus, the optical device according to the present invention can be produced efficiently and inexpensively, because the Fresnel lens can be mounted or packed (board-assembled) collectively with other parts by a high-temperature heat treatment (such as reflow soldering) without the need for being mounted by another step or process.

EXAMPLES

The present invention will be illustrated in further detail with reference to several examples (working examples) below. It should be noted, however, that the examples are by no means intended to limit the scope of the present invention.

Preparation Example 1

In a 300-mL round-bottomed flask, curable compounds and antioxidants were sequentially placed, followed by dissolving solids on an oil bath at 60° C. The curable compounds were 40 g of CELLOXIDE 2021P (3,4-epoxy-cyclohexylmethyl (3,4-epoxy)cyclohexanecarboxylate, supplied by Daicel Corporation), 30 g of YX8000 (hydrogenated bisphenol-A diglycidyl ether, supplied by Mitsubishi Chemical Corporation), and 30 g of OXT-221 (3-ethyl-3 [[(3-ethyloxetan-3-yl)methoxy]methyl]oxetane, supplied by Toagosei Co., Ltd.). The antioxidants were 1 g of Irganox 1010 (pentaerythritol tetrakis[3-(3,5-di-t-butyl-4-hydroxy-phenol)propionate], supplied by BASF SE) and 1 g of HP-10 (2,2'-methylenebis(4,6-di-t-butylphenyl)-2-ethylhexyl phosphite, supplied by ADEKA CORPORATION). After the dissolution, 1 g of a cationic photoinitiator CPI-101A (50% solution of 4-(phenylthio)phenyldiphenylsulfonium hexafluoroantimonate in propylene carbonate, supplied by San-Apro Ltd.) was added, and the resulting mixture was stirred at 30° C. for 1 hour and yielded a curable composition (1).

Preparation Example 2

The curable composition prepared in Preparation Example 1 was combined with 1000 ppm of inorganic filler (trade name White DCF-17050, supplied by Resino Color Industry Co., Ltd.), was stirred at room temperature for 1 hour, and yielded a curable composition (2).

Example 1

There was prepared a mold including a cope, and a drag having a concavity. The concavity had a reversed shape corresponding to a Fresnel lens having a total of three (large, medium, and small) sawtooth prisms, in which the largest sawtooth prism had surface fine asperities. The curable composition (1) prepared in Preparation Example 1 was charged into the drag and irradiated with light at a cumulative irradiance of 5000 mJ/cm$^2$ while being covered with the cope, and yielded a Fresnel lens (1). The Fresnel lens (1) had a size of 4.0 mm in length, 4.0 mm in width, and 0.5 mm in thickness, in which, of the three sawtooth prisms, the largest sawtooth prism had fine asperities (having an Ra of 20 µm) in the entire surface. The prepared Fresnel lens was subjected to after-mentioned evaluations.

Example 2

A Fresnel lens (2) was prepared by a procedure similar to that in Example 1, except for using a drag having smaller asperities. The Fresnel lens (2) had a size of 4.0 mm in length, 4.0 mm in width, and 0.5 mm in thickness, in which, of the three sawtooth prisms, the largest sawtooth prism had fine asperities (having an Ra of 5 µm) in the entire surface.

Example 3

A Fresnel lens (3) was prepared by a procedure similar to that in Example 1, except for using another drag as follows. This drag had a concavity having a reversed shape corresponding to a Fresnel lens, where the Fresnel lens has a total of three (large, medium, and small) sawtooth prisms, and the three sawtooth prisms have surface asperities. The Fresnel lens (3) had a size of 4.0 mm in length, 4.0 mm in width, and 0.5 mm in thickness, in which the three sawtooth prisms had fine asperities (having an Ra of 20 µm) in the entire surfaces.

Comparative Example 1

A Fresnel lens (4) was prepared by injection molding using polycarbonate resin (trade name H-4000, supplied by Mitsubishi Engineering-Plastics Corporation) instead of the curable composition (1) prepared in Preparation Example 1. The Fresnel lens (4) had a size of 4.0 mm in length, 4.0 mm in width, and 0.5 mm in thickness, in which, of three sawtooth prisms, the largest sawtooth prism had fine asperities (having an Ra of 20 µm) in the entire surface.

Comparative Example 2

A Fresnel lens (5) was prepared by a procedure similar to that in Example 1, except for using the curable composition (2) prepared in Preparation Example 2 instead of the curable composition (1) prepared in Preparation Example 1; and for using another drag. This drag had a concavity having a reversed shape corresponding to a Fresnel lens having a total of three (large, medium, and small) sawtooth prisms and having no surface fine asperities in any of the prisms. The Fresnel lens (5) had a size of 4.0 mm in length, 4.0 mm in width, and 0.5 mm in thickness and had no surface fine asperities in the prisms.

Comparative Example 3

A Fresnel lens (6) was prepared by a procedure similar to that in Example 1, except for using another drag. This drag had a concavity having a reversed shape corresponding to a Fresnel lens, where the Fresnel lens has a total of three (large, medium, and small) sawtooth prisms, in which the medium sawtooth prism has surface fine asperities. The Fresnel lens (6) had a size of 4.0 mm in length, 4.0 mm in width, and 0.5 mm in thickness, in which, of the three sawtooth prisms, the medium sawtooth prism had fine asperities (having an Ra of 20 μm) in the entire surface.

Comparative Example 4

A Fresnel lens (7) was prepared by a procedure similar to that in Example 1, except for using another drag. This drag had a concavity having a reversed shape corresponding to a Fresnel lens, where the Fresnel lens has a total of three (large, medium, and small) sawtooth prisms, in which the smallest sawtooth prism has surface fine asperities. The Fresnel lens (7) had a size of 4.0 mm in length, 4.0 mm in width, and 0.5 mm in thickness, in which, of the three sawtooth prisms, the smallest sawtooth prism had fine asperities (having an Ra of 20 μm) in the entire surface.

Comparative Example 5

A Fresnel lens (8) was prepared by a procedure similar to that in Comparative Example 4, except for using a drag having smaller asperities. The Fresnel lens (8) had a size of 4.0 mm in length, 4.0 mm in width, and 0.5 mm in thickness, in which, of the three sawtooth prisms, the smallest sawtooth prism had fine asperities (having an Ra of 5 μm) in the entire surface.

Comparative Example 6

A Fresnel lens (9) was prepared by a procedure similar to that in Example 1, except for using another drag. This drag had a concavity having a reversed shape corresponding to a Fresnel lens having a total of three (large, medium, and small) sawtooth prisms and having no surface fine asperities in any of the prisms. The Fresnel lens (9) had a size of 4.0 mm in length, 4.0 mm in width, and 0.5 mm in thickness and had no surface fine asperities in the prisms.

Lens Properties Evaluations

Figure 6:
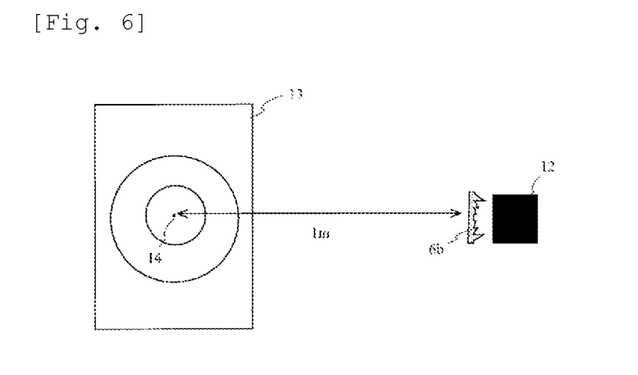
FIG. 6 schematically illustrates how to evaluate lens properties.

An LED light source was arranged immediately behind each of the Fresnel lenses obtained in the examples and comparative examples at a distance between the Fresnel lens and the light source of 1.0 mm. From the LED light source, light was applied to the Fresnel lens at such an illuminance that the central illuminance of an after-mentioned projection board be about 100 lux in the case where no Fresnel lens was arranged. In the projection board (1.2 m by 0.92 m) arranged forward of the Fresnel lens at a distance of 1.0 m, the illuminance of the central part (at a position facing the Fresnel lens directly), the average illuminance of four points at a radius of 0.54 m from the center, and the average illuminance of four points at a radius of 0.77 m from the center were measured using illuminometer CL-200A (supplied by Konica Minolta) (see FIG. 6). Illuminance percentages at the points surrounding the center were calculated while the illuminance at the central part (center) was defined as 100%. In addition, the presence or absence of light nonuniformity was visually observed, and the light uniformity was evaluated according to criteria as follows.

Light Uniformity Evaluation Criteria:
Good: Light was homogeneous without nonuniformity; and
Poor: Light was heterogenous with nonuniformity.

Separately, as a referential example, illuminance and light uniformity were determined by a procedure similar to above except for installing a Fresnel lens.

Heat Resistance Evaluation

Each of the Fresnel lenses obtained in the examples and comparative examples was subjected to heat resistance tests successively three times on the basis of the reflow temperature profile (highest temperature: 270° C.) prescribed in JEDEC Standards, using a table-top reflow oven (supplied by SHINAPEX CO., LTD.).

On the Fresnel lenses after the heat resistance tests, light uniformity and illuminance were determined by a procedure similar to that in the "lens properties evaluation", and the heat resistance was evaluated according to criteria as follows.

Evaluation Criteria for Optical Properties after Heat Tests:
Good: Light nonuniformity was not observed, and a change in illuminance was within ±5%; and
Poor: Light nonuniformity was observed, or a change in illuminance was out of the range even when the light nonuniformity was not observed.

Glass Transition Temperature Measurement

Using TMA measuring apparatus TMA/SS100 (trade name, supplied by SII NanoTechnology Inc.), each of the Fresnel lenses obtained in the examples and comparative examples was subjected to a pretreatment, in which the temperature was raised from −50° C. up to 250° C. at a rate of 20° C./min, and subsequently lowered from 250° C. down to −50° C. at a rate of −20° C./min. Thereafter a TMA measurement was performed while the temperature was raised from −50° C. up to 250° C. at a rate of temperature rise of 20° C./min in a nitrogen stream. The inflection point in a plot of coefficient of thermal expansion was defined as the glass transition temperature (Tg).

The results are collectively presented in the following table.

TABLE 1

| Lens properties | Examples | | | Comparative Examples | | | | | | Referential Example |
|---|---|---|---|---|---|---|---|---|---|---|
| | 1 | 2 | 3 | 1 | 2 | 3 | 4 | 5 | 6 | |
| Central illuminance (lux) | 172 | 165 | 130 | 168 | 121 | 158 | 160 | 160 | 162 | 97 |
| Average illuminance (%) at 0.54 m from the center | 49 | 55 | 48 | 50 | 55 | 58 | 59 | 60 | 59 | 70 |
| Average illuminance (%) at 0.77 m from the center | 27 | 28 | 25 | 28 | 32 | 27 | 29 | 29 | 30 | 51 |
| Light uniformity | Good | Good | Good | Poor | Poor | Poor | Poor | Poor | Poor | Poor |
| Optical properties after heat resistance tests | Good | Good | Good | Poor | Poor | Poor | Poor | Poor | Poor | — |
| Glass transition temperature (° C.) | 135 | 135 | 135 | 145 | 135 | 135 | 135 | 135 | 135 | — |

INDUSTRIAL APPLICABILITY

The Fresnel lens according to the present invention has such a configuration that the Fresnel lens includes a cured product of a curable composition containing an epoxy compound (A) and has a roughened surface in a specific prism.

The Fresnel lens therefore has excellent heat resistance and can undergo board assembly via reflow soldering collectively with other parts. The Fresnel lens enables production of optical devices with excellent working efficiency, where the optical devices each include the Fresnel lens. In addition, the Fresnel lens is also usable in on-vehicle electronic devices, which require heat resistance.

The Fresnel lens according to the present invention, when used, can convert light even from a poor-quality semiconductor light source into uniform, high-quality light and can disperse the resulting light without lowering the central illuminance. Thus, the Fresnel lens according to the present invention is advantageously usable typically as or in camera flash Fresnel lenses mounted on portable electronic devices such as smartphones; and prisms or Fresnel lenses for use in on-vehicle electronic devices.

REFERENCE SIGNS LIST

1 lens surface
2 non-lens surface
3 reference plane
4 drag
5 drag concavity
6a curable composition
6b Fresnel lens (i.e., cured product of curable composition)
7 cope
8 prism having fine asperities
9 cutting line
10 array of Fresnel lenses
11 individual Fresnel lens obtained by separation
12 semiconductor light source
13 projection board
14 central part

The invention claimed is:

1. A Fresnel lens comprising two or more sawtooth prisms in a surface thereof,
wherein the Fresnel lens is made of a cured product of a curable composition containing (A) an epoxy compound,
wherein, of the sawtooth prisms, only a sawtooth prism having a longest inclined side in a cross section has a roughened surface having an arithmetic mean surface roughness (Ra) of 1 to 30 μm, where the cross section is given by cutting the Fresnel lens in a plane which passes through a center of the Fresnel lens and which is perpendicular to a reference plane of the Fresnel lens.

2. The Fresnel lens according to claim 1,
wherein the epoxy compound (A) comprises a compound represented by Formula (a):

wherein $R^1$ to $R^{18}$ are each, identically or differently, selected from hydrogen, halogen, an optionally oxygen- or halogen-containing hydrocarbon group, and optionally substituted alkoxy; and X is selected from a single bond and a linkage group.

3. The Fresnel lens according to claim 1, wherein the curable composition further comprises:
(B) an oxetane compound; and
(C) a cationic-polymerization initiator,
in addition to the epoxy compound (A).

4. The Fresnel lens according to claim 1,
wherein the Fresnel lens has a glass transition temperature of 100° C. or higher.

* * * * *